United States Patent
Shyu et al.

(10) Patent No.: US 8,021,006 B2
(45) Date of Patent: Sep. 20, 2011

(54) LED ARRAY FLASH FOR CAMERAS

(75) Inventors: San-Woei Shyu, Taipei (TW); Chu-Fong Lam, Taipei (TW); Teng-Chien Yu, Taipei (TW); Yi-Fan Liao, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 278 days.

(21) Appl. No.: 12/331,021

(22) Filed: Dec. 9, 2008

(65) Prior Publication Data

US 2010/0014274 A1    Jan. 21, 2010

(30) Foreign Application Priority Data

Jul. 18, 2008 (TW) ................................. 97127496 A

(51) Int. Cl.
*F21V 5/04* (2006.01)

(52) U.S. Cl. ......... 362/3; 362/4; 362/8; 362/11; 362/12; 362/13; 362/16; 362/17

(58) Field of Classification Search ................... 362/3, 4, 362/8, 11, 12, 13, 16, 17; 348/361, 370, 348/371, 373; 396/164, 182, 205, 206, 155; 315/241 P See application file for complete search history.

(56) References Cited

U.S. PATENT DOCUMENTS

| | | | | |
|---|---|---|---|---|
| 2,588,373 A | * | 3/1952 | Erban | 359/455 |
| 2,853,599 A | * | 9/1958 | Kliegl | 362/333 |
| 7,136,672 B2 | | 11/2006 | Kitano et al. | |
| 7,236,697 B2 | | 6/2007 | Kim et al. | |
| 2003/0216151 A1 | | 11/2003 | Kitano et al. | |
| 2003/0218689 A1 | | 11/2003 | Angeli et al. | |
| 2007/0195176 A1 | | 8/2007 | Kawakami | |

FOREIGN PATENT DOCUMENTS

| | | |
|---|---|---|
| JP | 10-039795 | 2/1998 |
| JP | 2006-173622 | 6/2006 |

OTHER PUBLICATIONS

Abstract of JP10-039795 with the publication date of Feb. 13, 1998.*
Abstract of JP 2006-173622 with the publication date of Jun. 26, 2006.*

* cited by examiner

*Primary Examiner* — Sharon Payne
(74) *Attorney, Agent, or Firm* — Muncy, Geissler, Olds & Lowe, PLLC

(57) ABSTRACT

A LED array flash for cameras includes a LED array and a controller. The LED array consists of at least one LED light source with first order lens. The LED light source may be further covered with a second order lens. Thus an oblong or round distribution pattern with uniform light intensity is emitted. The controller is used to control flash modes such as low brightness continuous lighting or high brightness pulse lighting with lighting time control so as to save power and avoid overheating.

2 Claims, 9 Drawing Sheets

LED ARRAY FLASH FOR CAMERAS

BACKGROUND OF THE INVENTION

The present invention relates to a LED array flash for cameras, especially to a LED flashlight applied to cameras and formed by a LED array with a plurality of distribution pattern LED and a controller.

Xenon flash lamps are commonly used as photographic strobe lights due to high intensity of light generated by high voltage discharged between electrodes. The main advantages of the Xenon lamp are that spectral profile is uniform in the field of visible light and that is good chromaticity level and color rendering. Moreover, the Xenon lamp has short start-up time, inert gas without danger of explosion. However, it also has a plurality of disadvantages such as low lighting efficiency, short life, high cost and large amount of heat resulted. While being applied, the Xenon lamp consumes a lot power so that the flashlight is unable to be used quite often and the photo-sensor is adjusted by complicated software so as to achieve proper picture brightness.

LED (Light-Emitting Diode) is a semiconductor diode that emits light by electric exciting. Electric energy is converted into light energy directly. When electric current is applied, conduction electrons meet hole carriers and releases energy in the form of light. According to various materials with different energy levels being used, the LED emits light with different wavelength. Since, LED has advantages of compact volume, short start-up time and low pollution so that is has been applied to various fields. In recent years, the high power LED has been applied to cameras and can be used for a longer enough time so that brightness of the camera photo-sensor can be adjusted. Refer to US2007/195176, US2003/216151, and JP10-039795, LED may be replaced conventional Xenon lamps in cameras or phone cameras. However, brightness of single LED may be still not enough so that a LED array formed by a plurality of LED is used, as shown in U.S. Pat. No. 7,136,672, US2003/218689, U.S. Pat. No. 7,236,697, and JP2006-173622 etc. Because brightness of LED is not as high as traditional Xenon lamps, arrangement of LED in the LED array for photographing is quite important otherwise brightness of light on the target is not uniform. Moreover, the conventional control way such as pulse control or timer, brightness of each LED may be different from one another. Besides power consumption, the preset distribution pattern is another problem. Refer to FIG. 1, a conventional LED flashlight is formed by at least one LED light source 23, a LED die 233 and a LED board 24. Light emitted from the LED die 23 on the LED board 23 is reflected by a reflector 28 with paraboloid and is projected onto an object. However, while photographing object, under the condition that the light intensity of the LED light source 23 is limited, it is an important issue to make light from the LED light source 23 gather efficiently to form a preset distribution pattern on the object. To achieve the practice application, efficient lighting and lighting control is accomplishing the foregoing expectations.

SUMMARY OF THE INVENTION

Therefore it is a primary object of the present invention to provide a LED array flash for cameras. The LED array flashlight projects an ellipse distribution pattern on a target. That means light projected has a uniform oblong or round distribution pattern on target area through arrangement of LED array so as to avoid light diffusion and improve light efficiency.

In order to achieve above object, a LED array flash for cameras of the present invention is provided. The camera includes batteries for power supply and a light selector for control of the LED array flashlight. The LED flashlight of the present invention consists of a LED array and a controller. The LED array includes at least one LED light source, a LED board, and second order lens. Wherein, the LED light source further includes a first order lens and a LED die. The first order lens is disposed over the LED die that is assembled on the LED board. The first order lens focuses light form the LED die have preset distribution patterns. When a plurality of LED light sources is arranged into an array, a preset distribution pattern is formed on a target. Usually, the oblong distribution pattern is optimum to photographing character and scenery and the round distribution pattern is suitable for character photography.

In order to focus light to form above distribution pattern with uniform intensity, a second order lens is disposed over the LED light sources. The first/second order lens can be a Fresnel lens or an aspherical lens.

The controller of the LED flashlight includes a controller circuit that has a pulse circuit for generating pulse signal, a constant current circuit for generating constant current and a timer circuit for control of time. When the flashlight is used, lower continuous lighting or higher pulse lighting can be selected. Moreover, in order to control power supply and avoid overheating, a timer circuit is used to control lighting time of the LED light source.

DETAILED DESCRIPTION OF THE PREFERRED EMBODIMENT

Main components of the following embodiments of a LED array flash for cameras according to the present invention may be modified equivalently. For example, there is no restriction on shape design of the first order lens, and combinations of LED light sources. There is also no restriction on the shape of the second order lens, the long/short axis ratio of distribution patterns, light intensity and homogeneity. The current magnitude and pulse time are also not restricted.

Figure 1:
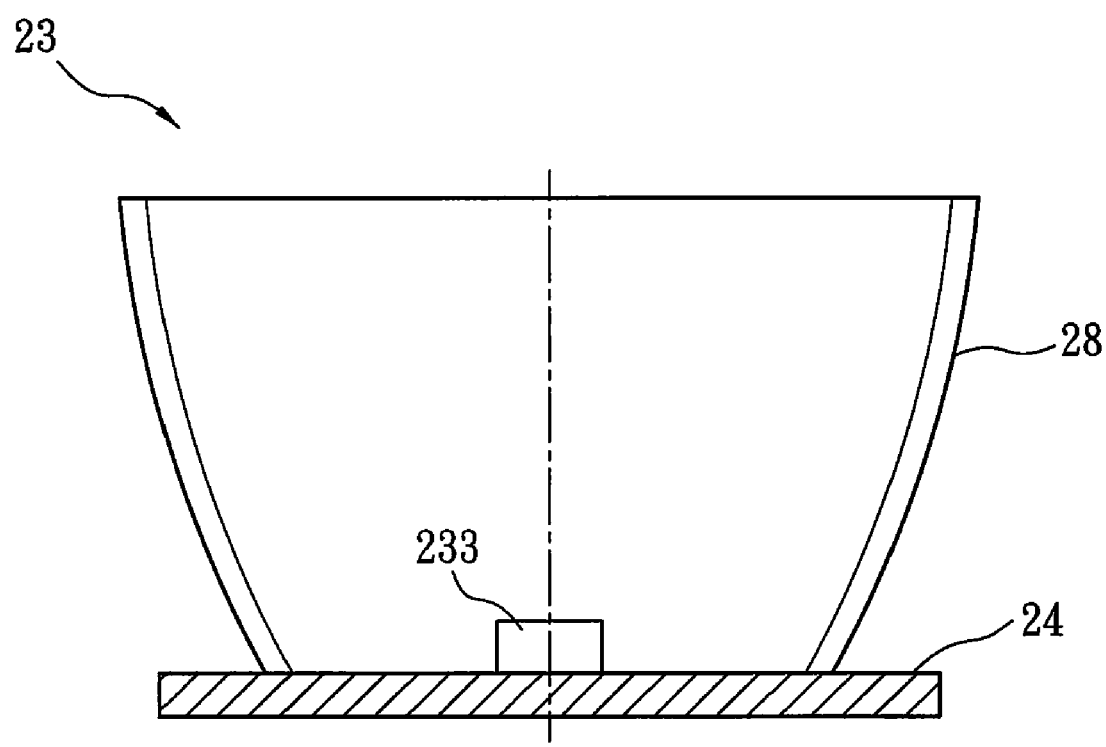
FIG. 1 is a cross-sectional view of a conventional LED flashlight.
Figure 2:
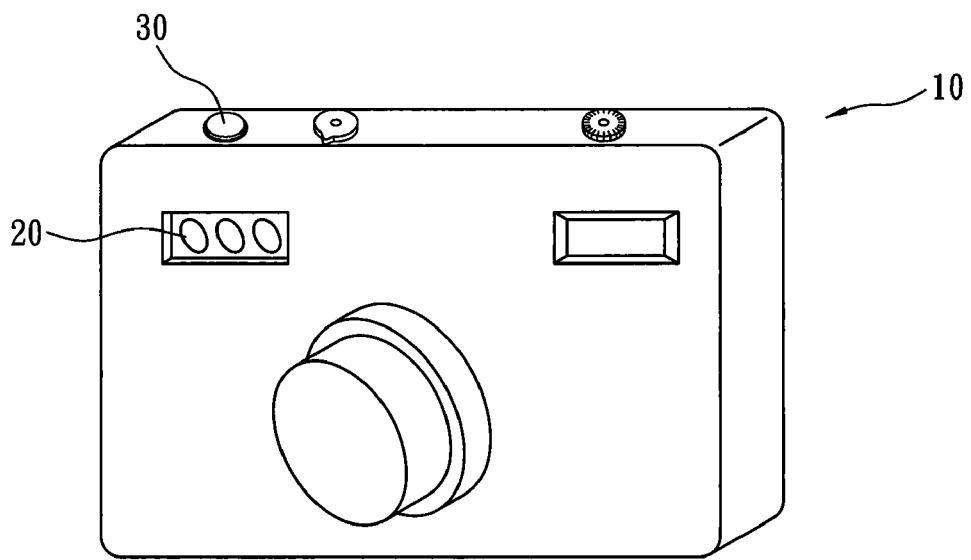
FIG. 2 is a schematic drawing showing an embodiment of the present invention assembled with the camera.

Refer to FIG. 2, a LED flashlight 20 according to the present invention is generally mounted in a camera 10 and is controlled by a light selector 30. While pressing the light selector 30 and selecting a first lighting mode (usually the first stage contact after pressing but not limited), a LED flashlight 20 is driven by constant small current to keep lighting, the focus of the camera is adjusted and exposure time is checked. When the light selector 30 is pressed and a second lighting mode is selected (generally the second stage contact after pressing but not limited), now the LED flashlight 20 is driven to emit high brightness lighting by a high voltage pulse and the camera captures images. The setting of pulse frequency is optimized according to functions, power consumption and heat dissipation of LED dies. In order to prevent overheating or power consumption under high brightness lighting, the light is turned off by the time control function. Furthermore, comparing with conventional xenon lamps, LED light sources have a shortcoming of lower light intensity, so that light from LED light sources needs to be focused and unified for projection. Generally, not restriction, while photographing character and scenery, the preferred distribution pattern is oblong with long/short axis ratio of 2:1 and high brightness lighting mode; while photographing character only, the preferred distribution pattern is round and high brightness lighting mode.

Embodiment One

Figure 3:
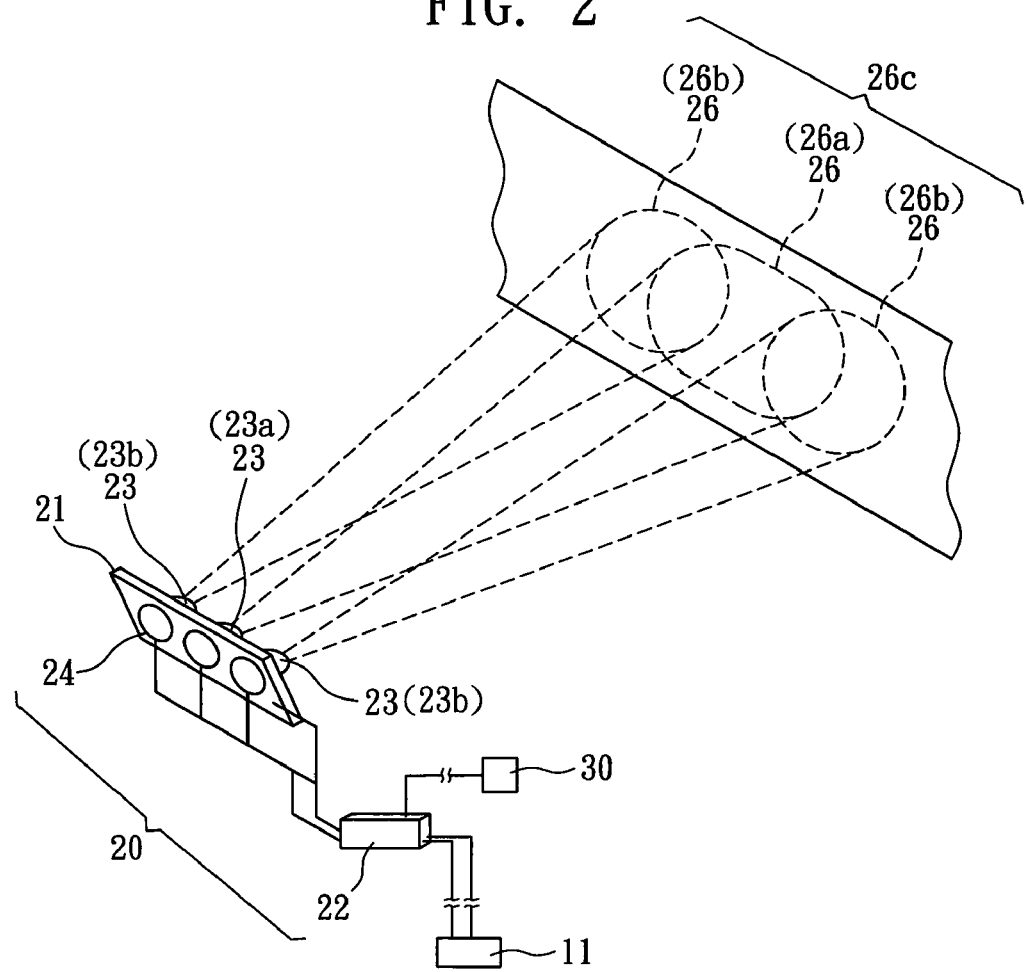
FIG. 3 is an explosive view of an embodiment according to the present invention.
Figure 4A:
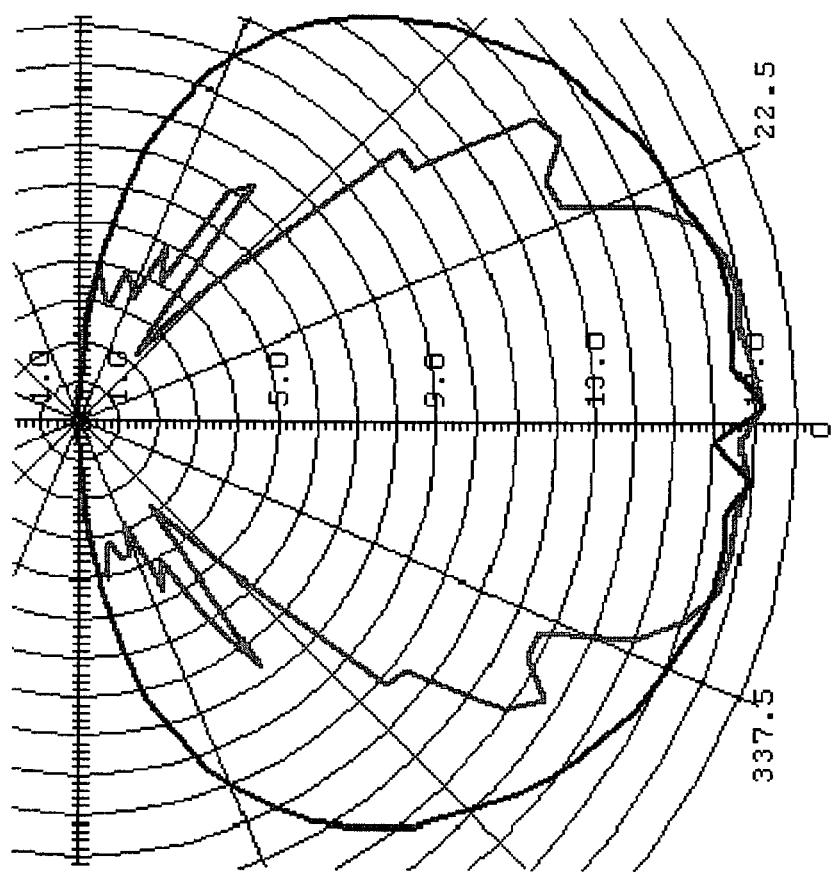
FIG. 4A shows pole plot of an embodiment according to the present invention.
Figure 4:
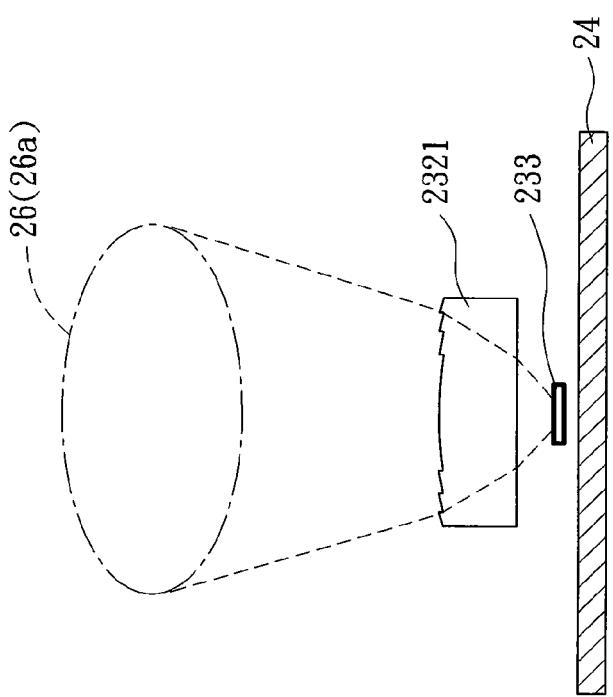
FIG. 4 shows a distribution pattern of a single LED of an embodiment according to the present invention.
Figure 5:
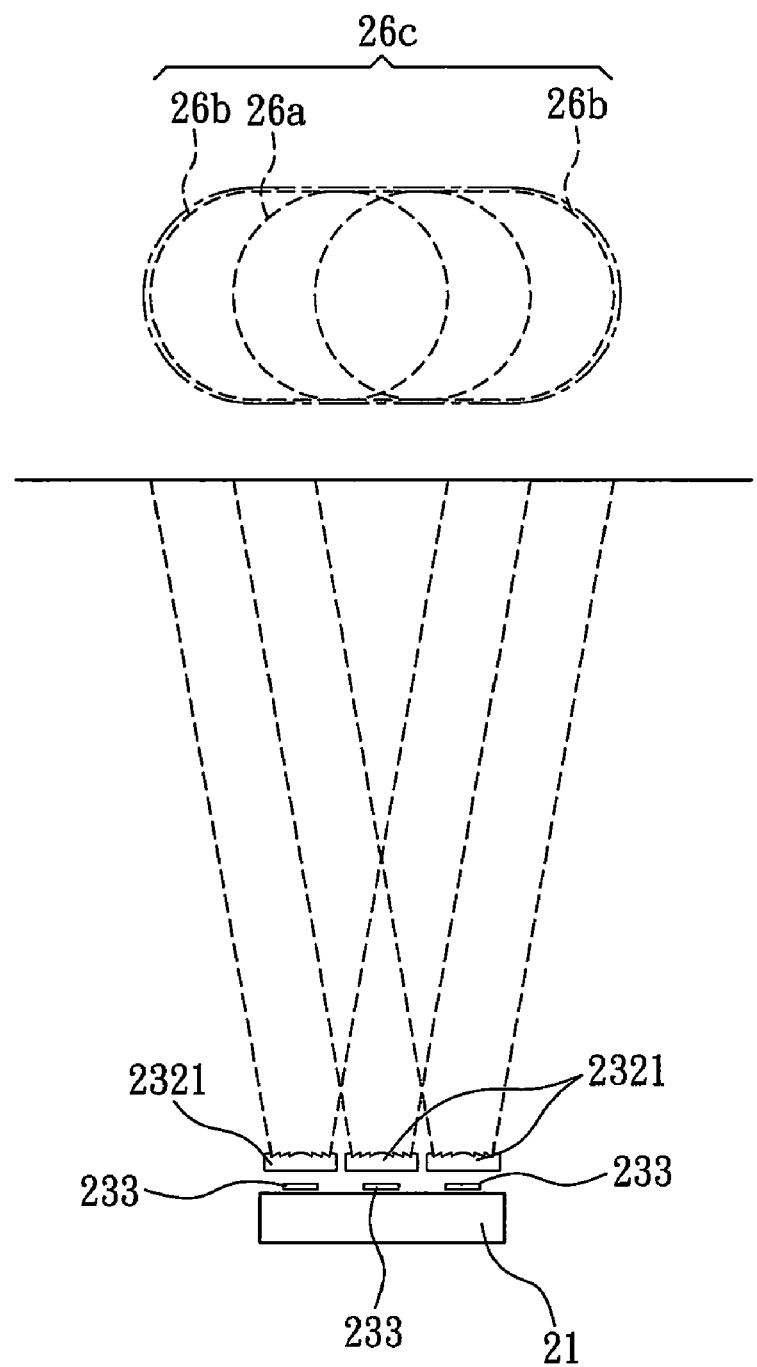
FIG. 5 is a distribution pattern of a LED array of an embodiment according to the present invention.

Refer from FIG. 3 to FIG. 5, a LED flashlight 20 consists of a LED array 21 and a controller 22. The LED array 21 is formed by three LED light sources 23 disposed lined in parallel on a LED board 24. The LED board 24 is connected with and controlled by the controller 22. The controller 22 not only connects with a battery 11 for power supply but also connects with the light selector 30 for selecting lighting mode so as to make the LED light source 23 emit light of preset shape of light distribution patterns 26. In this embodiment, high power white light LED die 233 is used, the LED light source 23 included a first order lens 2321 and a LED die 233. Light emitted from the LED die 233 passes the first order lens 2321 to form preset distribution pattern 26. The LED array 21 in this embodiment is formed by three LED light sources 23 arranged in certain distance with one another to emit an ellipse distribution patterns 26c, as FIG. 5. The first order lens 2321 of the LED light sources 23 in the middle position is a Fresnel lens with special design and its shape is shown in FIG. 4. Distribution pattern of the Fresnel lens is an elliptic distribution pattern (120°×60°) 26a and a pole plot of light intensity thereof is shown in FIG. 4A. Similarly, the LED light source 23 on two sides can use the Fresnel lens with different parameters as the first order lens 2321 so as to form a 90° narrow angular distribution pattern 26b.

While used three LED sources 23 (23a, 23b), light from the LED array 21 becomes an oblong ellipse distribution pattern 26c with uniform light intensity, as shown in FIG. 5. The oblong distribution pattern 26c with long/short axis ratio of 2.2:1 is formed on a target at infinity (relative 100× composite focal length), ignored the light refraction and diffusion in the air. Thus the shortcoming of conventional LED that forms a circle or a rectangular distribution pattern with not uniform intensity=on the target is overcome.

Figure 11:
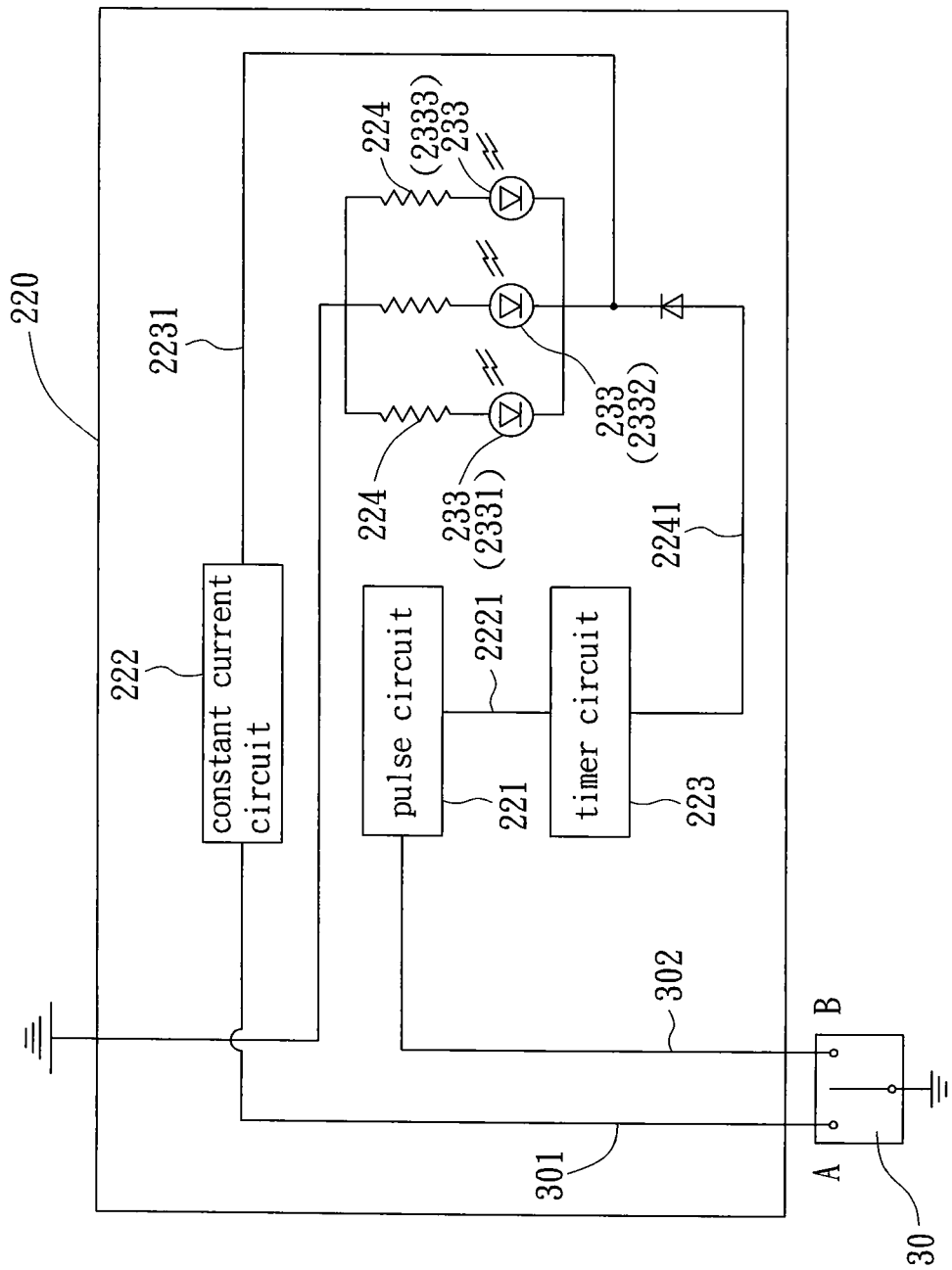
FIG. 11 is a block diagram of a controller circuit of an embodiment according to the present invention.
Figure 12:
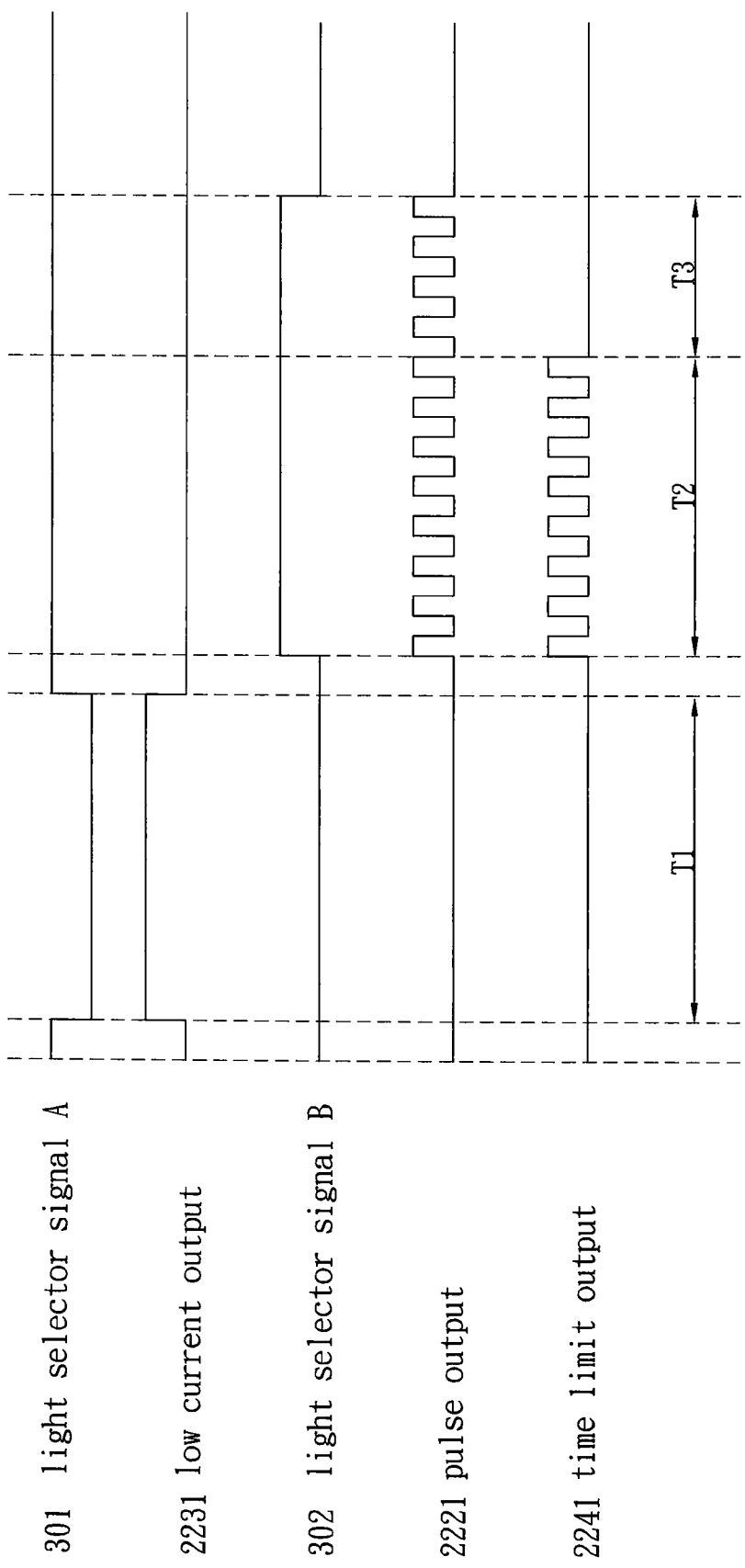
FIG. 12 is a schematic drawing showing signal versus output level of a controller circuit of an embodiment according to the present invention.

Refer to FIG. 11 & FIG. 12, the LED array 21 of the present invention is controlled by the controller 22. The controller 22 has a controller circuit 220 including a pulse circuit 221, a constant current circuit 222 and a timer circuit 223, connected with three parallel LED dies 2331~2333 and feedback resistances 224. As shown in FIG. 11, while pressing the light selector 30 to select the first lighting mode, the battery 11 connects with a contact point A and a light selector signal A 301 enters the constant current circuit 222 so as to generate the constant current circuit 222 to provide each LED dies 2331~2333 with the same 30 mA low current output 2231. Thus each LED dies 2331~2333 emits light with 10% full brightness. In this embodiment, the circuit is parallel so that current passes each LED dies 2331~2333 nearly the same and light from each LED die is with the same (or equivalent) intensity. Therefore, the distribution pattern 26(26c) on the target has uniform brightness and exposure quality is improved. When the light selector 30 is cut from the contact point A, the battery 11 doesn't contact with the contact point A and the constant current circuit 222 shuts low current output 2231 so that the LED dies 2331~2333 stop emitting light. Refer to FIG. 12, the light selector signal A 301 transmits high level to low level, the low current output 2231 transmits low level to high level for driving LED dies 2331~2333. After an interval of T1, the light selector signal A 301 transmits low level to high level (being off the contact point A) then the low current output 2231 transmits from high level to low level and shuts output to the LED dies 2331~2333. While the second lighting mode is selected by the light selector 30, the battery 11 connects with a contact point B and a light selector signal B 302 enters the pulse circuit 221 so that the pulse circuit 221 generates a pulse output 2221 that enters timer circuit 223. Thus in a certain period available for pulse output, each LED die 2331~2333 is provided with a time limit output 2241 of the same constant high current 0.35 A. In this embodiment, the pulse output 2221 is ⅕ sec pulse and high current 2 A. Thus the LED dies 2331~2333 emit light with 500% full brightness. In applications, this is the output for photographing.

When preset time of the pulse output is up, the timer circuit 223 cuts off the time limit output 2241 so as to make the LED dies 2331~2333 stop lighting for preventing over temperature and saving power. When the light selector 30 is cut off the contact point B, the batter 11 disconnects with the contact point B and the pulse circuit 221 stops providing the pulse output 2221. The time limit output 2241 of the timer circuit 223 is shut, as the LED dies 2331~2333 stop emitting light. Refer to FIG. 12, when the light selector signal B 302 transmits high level to low level (connect with the contact point B), both the pulse output 2221 and the time limit output 2241 transmits low level to pulse output so as to drive the LED dies 2331~2333. After a preset period of time T2, no matter the light selector signal B 302 is at high or low level, the time limit output 2241 turns into low level and stops output to the LED dies 2331~2333. In order to simplify the circuit and the control, when the time T2 is up and the time moves to T3 period, the pulse output 2221 continues but the time limit output 2241 stops output pulse power. When the light selector signal B 302 transmits low level to high level (disconnect from the contact point B). The pulse output 2221 changes from high level pulse to low level and stops output to the timer circuit 223.

It is learned from above mention that conventional way of control LED light source is by constant current or pulse signal. However, the present invention is applied to camera flashlights and the LED dies 2331~2333 are arranged in parallel so that they have the same current magnitude for generating light with similar brightness. Thus the requirement of uniform light intensity of distribution patterns on targets is achieved. Furthermore, for metering and taking picture, the present invention provides two lighting modes—continuous lighting by constant small current and high power pulse light that can be used according to users' needs.

Embodiment Two

Figure 7:
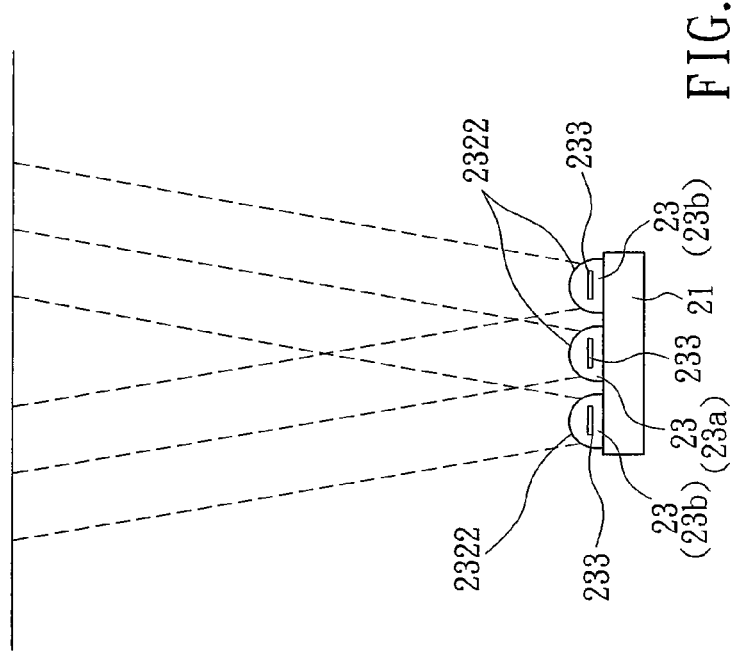
FIG. 7 is a distribution pattern of a LED array of a further embodiment according to the present invention.
Figure 6:
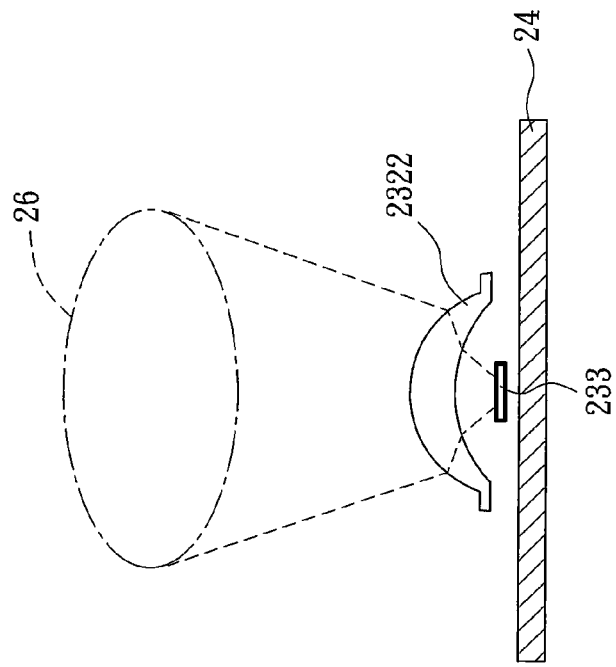
FIG. 6 is a distribution pattern of a single LED of another embodiment according to the present invention.
Figure 8:
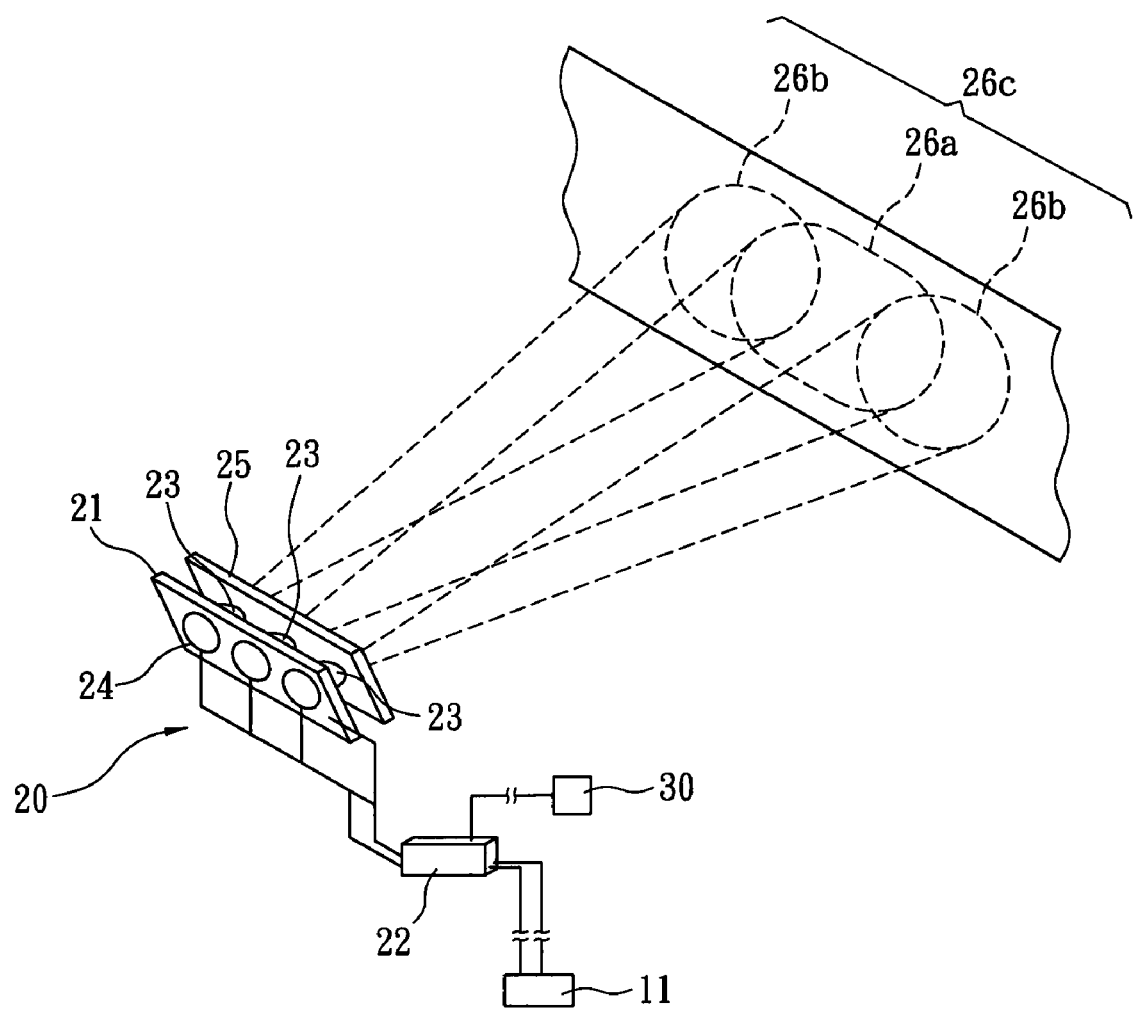
FIG. 8 is an explosive view of a further embodiment according to the present invention.

Refer from FIG. 6 to FIG. 8, the LED flashlight 20 has similar structure with the above embodiment while the difference between this embodiment and the above one is in that: the first order lens 2322 of the LED light source 23 is an aspherical meniscus lens, as shown in FIG. 6, the concave surface is facing the LED die 233 while the convex surface is facing the object. The LED light source 23a disposed in the middle of LED array, emits an 120°×90° elliptic distribution pattern 26a. The LED light source 23b on two sides of LED array, emits a 90° narrow angle distribution pattern 26b; where the first order lens 2322 of LED light source 23b is also an aspherical meniscus lens with different optical parameters.

While used three LED sources 23 (23a, 23b), light from the LED array 21 becomes an oblong ellipse distribution pattern 26c with uniform light intensity, as shown in FIG. 5. The oblong distribution pattern 26c with long/short axis ratio of 1.8:1 is formed on a target at infinity (relative 100× composite focal length), ignored the light refraction and diffusion in the air. The controller 22 in this embodiment has the same function of the embodiment one.

Embodiment Three

Figure 9:
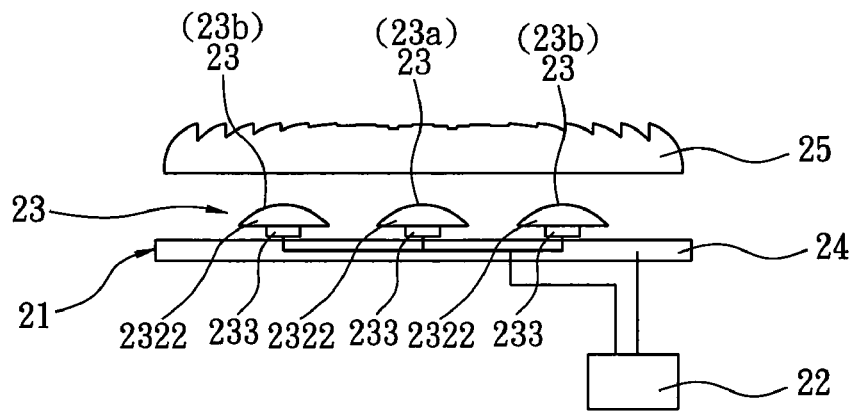
FIG. 9 shows structure of the LED array of the further embodiment according to the present invention.
Figure 10:
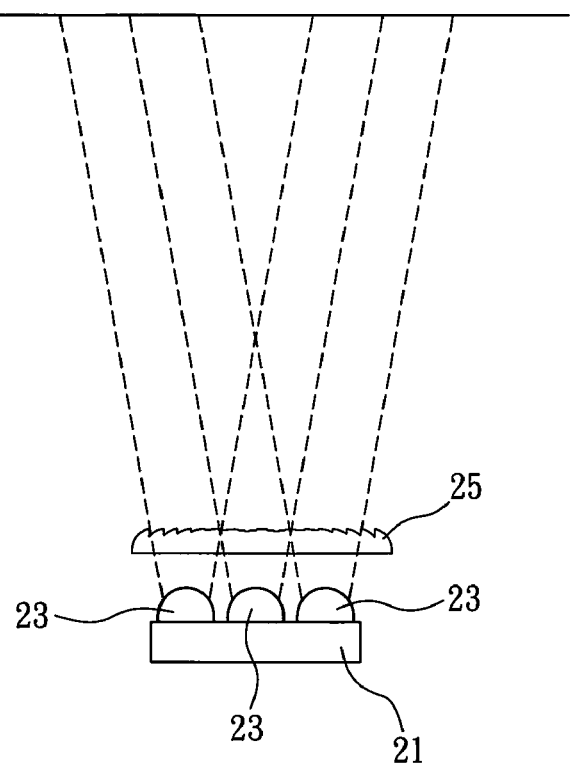
FIG. 10 is a distribution pattern of a LED array of the further embodiment according to the present invention.

Refer from FIG. 9 to FIG. 10, The LED flashlight 20 of the present invention includes a LED array 21 formed by three LED light sources 23 arranged horizontally and a second order lens 25. The first order lens 2322 of the LED light source 23 is an aspherical meniscus lens, the same with that of the above embodiment. Light emitted from the LED light source 23a in the middle has an 120°×90° elliptic distribution pattern 26a while the first order lens 2322 of the LED light source 23b on two sides is also an aspherical meniscus lens with different optical parameters so as to form a 90° narrow angle distribution pattern 26b. This embodiment further includes a second order lens 25 covered over the three LED light sources 23. The second order lens 25 is a Fresnel lens that changes distribution pattern from the three LED light sources 23 into an oblong distribution pattern 26c with more uniform light intensity on a target at infinity (relative 100× composite focal length). The oblong distribution pattern 26c with long/short axis ratio of 2.0:1 is formed on a target at infinity (relative 100× composite focal length), ignored the light refraction and diffusion in the air. The controller 22 in this embodiment has the same function of the embodiment one.

In a further embodiment of the present invention, once the user intends to shoot objects/character in a small range such as photographing faces by phone cameras, the round distribution pattern is suitable. Then LED light source 23a in the middle emits light with an 30°×60 elliptic distribution pattern 26a while the LED light source 23b on two sides emits a 60° narrow angle distribution pattern 26b. Thus the LED flashlight 20 emits a round distribution pattern 26c with long/short axis ratio of 1.3:1.

In summary, the LED flashlight according to the present invention has the following advantages:

(1) The LED flashlight of the present invention, LED flashlight can be design with different distribution patterns so as to provide light for taking pictures.

(2) The LED flashlight of the present invention further includes a second order lens so as to make the distribution pattern on the object have uniform light intensity.

(3) The flashlight modes such as low brightness flashlight or high brightness pulse lighting can be changed by the controller circuit according to user selection. Moreover, the lighting time of the pulse lighting can be controlled so as to save power and avoid overheating.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A LED array flash for cameras applied to cameras with a light selector for control of lighting mode comprising a LED array and a controller; wherein the LED array has three LED light sources connected in parallel and disposed at certain distance from one another horizontally on the LED board, wherein the light LED source in the middle emits an elliptic distribution pattern and the LED sources on two sides emit a round distribution pattern so as to form an oblong distribution pattern; the LED light source comprises a LED die and a first order lens that focuses light from the LED die to form preset oblong distribution pattern, the first order lens being selected from the group of Fresnel lens and aspherical meniscus lens so as to emit a preset elliptic or round distribution pattern;

the controller is a controller circuit that includes at least one constant current circuit and a pulse circuit while the controller circuit is connected with the parallel LED light sources of the LED array so as to form at least two lighting modes that are selected or switched by the light selector of the camera; the controller further comprising a timer circuit that cuts off pulse output from the pulse circuit to the LED array after a preset period of time;

wherein when the constant current circuit of the controller is selected by the camera light selector, each LED light source of the LED array is provided with constant current so that the LED array is in low-brightness continuous lighting mode;

wherein when the pulse circuit is selected by the camera light selector, each LED light source of the LED array is provided with pulse output so that the LED array is in high-brightness pulse lighting mode.

2. A LED array flash for cameras applied to cameras with a light selector for control of lighting mode comprising a LED array and a controller; wherein the LED array has three LED light sources connected in parallel and disposed at certain distance from one another on the LED board, wherein the light LED source in the middle emits an elliptic distribution pattern and the LED sources on two sides emit a round distribution pattern so as to form an oblong distribution pattern; and a second order lens covered over the LED light sources; the LED light source comprises a LED die and a first order lens that focuses light from the LED die to pass through the first order lens and the second order lens to form preset oblong distribution pattern, the first order lens being selected from the group of Fresnel lens and aspherical meniscus lens so as to emit a preset elliptic distribution pattern, wherein the second order lens is a Fresnel lens;

the controller is a controller circuit that includes at least one constant current circuit and a pulse circuit while the controller circuit is connected with the parallel LED light sources of the LED array so as to form at least two lighting modes that are selected or switched by the light selector of the camera, wherein the controller further comprising a timer circuit that cuts off pulse output from the pulse circuit to the LED array after a preset period of time;

wherein when the constant current circuit of the controller is selected by the camera light selector, each LED light source of the LED array is provided with constant current so that the LED array is in low-brightness continuous lighting mode;

wherein when the pulse circuit is selected by the camera light selector, each LED light source of the LED array is provided with pulse output so that the LED array is in high-brightness pulse lighting mode.

* * * * *